(12) United States Patent
Stojanovic et al.

(10) Patent No.: US 11,510,012 B2
(45) Date of Patent: Nov. 22, 2022

(54) INTEGRATED OPTICAL TRANSDUCER AND METHOD FOR FABRICATING AN INTEGRATED OPTICAL TRANSDUCER

(71) Applicant: ams AG, Premstätten (AT)

(72) Inventors: Goran Stojanovic, Eindhoven (NL); Colin Steele, Eindhoven (NL); Erik Jan Lous, Eindhoven (NL); Anderson Pires Singulani, Eindhoven (NL)

(73) Assignee: AMS AG, Premstätten (AT)

( * ) Notice: Subject to any disclaimer, the term of this patent is extended or adjusted under 35 U.S.C. 154(b) by 42 days.

(21) Appl. No.: 17/279,302

(22) PCT Filed: Aug. 23, 2019

(86) PCT No.: PCT/EP2019/072608
§ 371 (c)(1),
(2) Date: Mar. 24, 2021

(87) PCT Pub. No.: WO2020/064239
PCT Pub. Date: Apr. 2, 2020

(65) Prior Publication Data
US 2021/0400397 A1      Dec. 23, 2021

(30) Foreign Application Priority Data

Sep. 26, 2018   (EP) .................................... 18196907

(51) Int. Cl.
*H04R 3/00*        (2006.01)
*H04R 23/00*       (2006.01)
*G01H 9/00*        (2006.01)

(52) U.S. Cl.
CPC ............. *H04R 23/008* (2013.01); *G01H 9/00* (2013.01); *H04R 2201/003* (2013.01)

(58) Field of Classification Search
CPC ... H04R 23/008; H04R 2201/003; G01H 9/00
(Continued)

(56) References Cited

U.S. PATENT DOCUMENTS 7,355,720 B1   4/2008   Carr
9,516,421 B1   12/2016  Loeppert et al.
(Continued)

FOREIGN PATENT DOCUMENTS

CN     104891423 A    9/2015
CN     105452832 A    3/2016

OTHER PUBLICATIONS

Bergqvist et al., "A silicon condenser microphone with highly perforated back plate", IEEE, 1991, 4 pages.
(Continued)

*Primary Examiner* — Ammar T Hamid
(74) *Attorney, Agent, or Firm* — MH2 Technology Law Group LLP

(57) ABSTRACT

An integrated optical transducer for detecting dynamic pressure changes comprises a micro-electro-mechanical system, MEMS, die having a MEMS diaphragm with a first side exposed to the dynamic pressure changes and a second side. The transducer further comprises an application specific integrated circuit, ASIC, die having an evaluation circuit configured to detect a deflection of the MEMS diaphragm, in particular of the second side of the MEMS diaphragm. The MEMS die is arranged with respect to the ASIC die such that a gap with a gap height is formed between the second side of the diaphragm and a first surface of the ASIC die and the MEMS diaphragm, the ASIC die and a suspension structure of the MEMS die delineate a back volume of the integrated optical transducer.

24 Claims, 3 Drawing Sheets

(58) Field of Classification Search
USPC .................................................. 381/111, 122
See application file for complete search history.

(56) References Cited

U.S. PATENT DOCUMENTS

| | | |
|---|---|---|
| 2007/0165896 A1* | 7/2007 | Miles .................. H04R 23/006 |
| | | 381/356 |
| 2012/0057729 A1 | 3/2012 | Rauscher |
| 2015/0060955 A1 | 3/2015 | Chen |
| 2016/0007108 A1 | 1/2016 | Lee et al. |
| 2016/0221822 A1 | 8/2016 | Krumbein et al. |
| 2017/0164117 A1 | 6/2017 | Zou et al. |
| 2017/0289703 A1 | 10/2017 | Bartl et al. |
| 2019/0391415 A1* | 12/2019 | Lipson ................. A61N 5/0622 |

OTHER PUBLICATIONS

Bergqvist et al., "Capacitive Microphone with a Surface Micromachined Backplate Using Electroplating Technology", Journal of Microelectromechanical Systems, vol. 3, No. 2, Jun. 1994, 7 pages.
Kuhnel et al., "A silicon condenser microphone with structured back plate and silicon nitride membrane", Sensors and Actuators A, vol. 30, 1992, 8 pages.
Scheeper et al., "Fabrication of silicon condenser microphone using single wafer technology", Journal of Microelectromechanical Systems, vol. 1, No. 3, Sep. 1992, 8 pages.
International Search Report and Written Opinion in corresponding International Application No. PCT/EP2019/072608 dated Dec. 17, 2019, 10 pages.
Chinese First Office Action (with English Translation) in Chinese Application No. 201980060239.9 dated Jun. 17, 2022, 17 pages.

\* cited by examiner

INTEGRATED OPTICAL TRANSDUCER AND METHOD FOR FABRICATING AN INTEGRATED OPTICAL TRANSDUCER

CROSS-REFERENCE TO RELATED APPLICATIONS

The present application is the national stage entry of International Patent Application No. PCT/EP2019/072608, filed on Aug. 23, 2019, published as WO 2020/064239 A1 on Apr. 2, 2020, which claims benefit of priority of European Patent Application No. 18196907.2 filed on Sep. 26, 2018, all of which are hereby incorporated by reference in their entirety for all purposes.

FIELD OF THE INVENTION

This disclosure relates to an integrated optical transducer for sensing dynamic pressure changes, in particular acoustic waves, and to a fabrication method of such a transducer.

BACKGROUND OF THE INVENTION

Micro-electro-mechanical systems, MEMS, transducers for sensing dynamic pressure changes are used in a wide range of applications in modern consumer electronics, in particular as microphones for sensing pressure waves in the acoustic frequency band. Common examples in which integrated MEMS microphones play an important role are portable computing devices such as laptops, notebooks and tablet computers, but also portable communication devices like smartphones or smartwatches. Due to increasing space constraints of these devices, components are becoming more and more compact and are decreasing in size. As this also applies to MEMS microphones employed in these devices, they have become highly integrated components with sophisticated package designs and are characterized by a small size, high sound quality, reliability and affordability.

SUMMARY

This disclosure provides an improved concept for an integrated optical transducer with reduced size and high sensitivity.

The improved concept is based on the idea of providing an integrated optical transducer, which does not require an additional enclosure or packaging for defining its back volume. This decreases on the one hand the total dimensions of the transducer as no additional die is required to delineate a back volume of the transducer, and on the other hand simplifies the fabrication process for the same reason. The underlying basis of the improved concept is formed by an optical readout, which allows larger distances between the application-specific integrated circuit, ASIC, and the microelectromechanical systems, MEMS, diaphragm of the transducer. In addition, no perforated back plate is required to be arranged in between, therefore creating a larger effective back volume compared to conventional transducers that rely on capacitive readout, for example.

For example, an integrated optical transducer for detecting dynamic pressure changes according to the improved concept comprises a MEMS die having a MEMS diaphragm with a first side exposed to the pressure and a second side, and an ASIC die having an evaluation circuit which is configured to detect a deflection of the MEMS diaphragm, e.g. of the second side of the MEMS diaphragm. For being exposed to the pressure, the first side is facing an environment of the transducer and may therefore be regarded as an outer side. On the contrary, the second side is facing the ASIC die and may therefore be regarded as an inner side.

According to the improved concept, the MEMS die is arranged with respect to the ASIC die such that a gap with a gap height is formed between the second side of the diaphragm and a first surface of the ASIC die. Moreover, the MEMS diaphragm, the ASIC die and a suspension structure of the MEMS die delineate a back volume of the integrated optical transducer.

For such an integrated transducer, the MEMS die and the ASIC die are enabled to be fabricated separately, such that no costly and complicated fabrication process is required that is both MEMS and CMOS compatible at the same time. Instead, the MEMS die is fabricated following a MEMS compatible process for forming the suspension structure and the MEMS diaphragm, which is for example a membrane made of a material such as silicon nitride, crystalline-silicon or poly-silicon. Independent from this, the ASIC die is fabricated following a CMOS compatible process for forming the ASIC, which comprises the evaluation circuit for reading out a deflection of the MEMS diaphragm induced by dynamic pressure changes, such as acoustic pressure waves.

In a consequent step, the two dies are arranged with respect to each other such that the back volume is created in between the MEMS diaphragm and the ASIC die, wherein the back volume is characterized by a gap with a certain gap height. The first surface is a surface of the ASIC die facing the MEMS diaphragm. For the finalized transducer, the MEMS die and the ASIC die are bonded together, for example following conventional wafer bonding techniques which may be of an adhesive or of a eutectic type, for instance.

The readout of the diaphragms deflection caused by dynamic pressure changes in an environment of the transducer is realized optically, for example via an optical deflection measurement scheme, such as a beam-deflection measurement known from atomic force microscopy, or via an optical interferometric measurement. In particular for these measurement schemes, the MEMS diaphragm including its surfaces is not required to be perforated, patterned, structured or the like for readout purposes, but may be a diaphragm with plain surfaces across its entire surface area.

In some embodiments, the integrated optical transducer consists of the MEMS die and the ASIC die as only dies. For example, the back volume is free from further elements such as a perforated back plate or optical elements like a grating element.

Conventional transducers, for example those based on an optical interferometric grating or on a capacitive readout, typically require an element that is arranged in between the evaluation circuit and the diaphragm, for example a perforated back plate or a back plate acting as electrode, close to the diaphragm, which can influence the effective back volume and/or make the fabrication process more complicated. Typically, this means that either an additional third die is required in order to provide this additional element, or this element is fabricated on the MEMS die, making its fabrication process more elaborate and costly.

Moreover, conventional transducers typically require an enclosure of a third die to generate the back volume.

In contrast, a transducer according to the improved concept utilizing the described readout method only consists of the MEMS die and the ASIC die as its only dies. This implies a compact design without an enlarging enclosure package as well as a short and simple fabrication routine.

In some embodiments, the MEMS die and/or the ASIC die further comprises stress release structures.

Stress release structures may be used for preventing a large amount of stress induced onto the MEMS die, for example during handling and operation of the finalized transducer but also at an earlier stage during bonding of the MEMS die to the ASIC die. For instance, a dedicated adhesive, a patterned adhesive or gold bumps may be employed as stress release structures on the MEMS die and/or on the ASIC die. With this, also an attachment, or bonding, of the transducer to a printed circuit board, PCB, may be performed without risking breakage of the transducer and/or its components.

In some embodiments, the gap height is equal to or larger than 20 µm, in particular equal to or larger than 100 µm.

Conventional transducers based on capacitive readout typically have the limitation of a small gap between the diaphragm and the electrode back plate with a gap height of less than 5 µm. Transducers based on optical interferometric grating readout are subject to a similar restriction, as also for them the gap height ideally needs to be less than 10 µm. This is regardless of whether the grating is comprised in the diaphragm itself or provided via an additional perforated back plate. In both cases, a larger gap height would lead to a significant decrease of the signal-to-noise ratio, SNR. However, the small gap in these conventional transducers comes at the expense of a large acoustic impedance, which is caused by the limited compressibility of the air in combination with the small acoustic capacitance of the air inside the small back volume. For this reason, these conventional transducers typically require an enlargement of their effective back volume, for example by employing an additional enclosure and connecting its volume to the back volume of the transducer.

In contrast, the above-mentioned optical readout permits gap heights in excess of 20 µm or even 100 µm or 200 µm, therefore significantly increasing the enclosed back volume and hence providing a large acoustic capacitance. As a consequence, an air compression caused by a deflection of the diaphragm towards the ASIC die, for example caused by an incident pressure wave, is distributed across the entire back volume and therefore provides less acoustic impedance that destructively acts back onto the diaphragm. Limitations of conventional transducers are consequently overcome in these embodiments without the requirement of an additional package, therefore enabling high-sensitivity transducers in a compact design.

In some embodiments, the integrated optical transducer further comprises a pressure equalization channel connecting the back volume with an environment of the integrated optical transducer.

Static air pressure levels typically fluctuate by several kPa around the standard atmosphere level of 101.3 kPa at sea level. As the level of pressure waves, for example acoustic waves, are in the order of 1 Pa and can be even as small as 20 µPa, which is considered the threshold for human hearing, equal pressure levels in the environment and inside the transducer, i.e. in the back volume, are required for the detection of small pressure fluctuations due to a sound wave, for instance. In order to ensure the equality between the static pressure of the environment and the air inside the back volume between the diaphragm and the ASIC die, the transducer comprises a pressure equalization channel in these embodiments.

In at least one embodiment, the pressure equalization channel extends through the MEMS die, in particular through the MEMS diaphragm or through the suspension structure.

The pressure equalization channel in these embodiments may be defined by a hole in the MEMS diaphragm, for example, through which the pressure of the air inside the back volume equilibrates to the environment. Alternatively, the channel may extend entirely through the suspension structure in some of these embodiments.

In at least one embodiment, the pressure equalization channel extends at least partially through the ASIC die.

An alternative arrangement for the pressure equalization channel is to extend entirely or partially through the ASIC die. For example, a hole through the ASIC die may connect the back volume to the environment of the transducer.

Alternatively, the channel may extend from the environment to a surface of the ASIC die, in particular the first surface, through the suspension structure and from there connect to the back volume by means of a trench in the ASIC die, for example.

In some embodiments, the integrated optical transducer according to the improved concept further comprises a via, in particular a through substrate via or a through silicon via, extending through the MEMS die, in particular through the suspension structure, and being in electrically contact with the ASIC die, in particular with a contact pad of the ASIC die.

To provide an electrical connection to contacts on the ASIC die, for example for operating the evaluation circuit and receiving a measurement signal, vias through the MEMS die may be required. This is particularly the case if a PCB is to be attached to a surface of the MEMS die facing away from the ASIC die, making the transducer a bottom port transducer. These vias may be defined by through substrate vias or through substrate vias, TSV, depending on the fashion, in which the PCB is attached to the transducer.

In some embodiments, the MEMS diaphragm is electrically isolated from the ASIC die.

In some alternative embodiments, the MEMS diaphragm is electrically connected to the ASIC die, in particular by means of a diaphragm via extending through the suspension structure.

Depending on the purpose of the transducer, it may be desirable to electrically connect the MEMS diaphragm, for example for discharging static electricity. To this end, a via may extend from the ASIC die, in particular from a contact pad of the ASIC, through the suspension structure to the diaphragm, for instance. For other applications, this electrical connection may either not be desirable or required such that no additional via is necessary.

In some embodiments, the evaluation circuit comprises a light source, in particular a coherent light source configured to emit a probe beam, and an optical element configured to couple the probe beam from an optical circuit of the ASIC die into the back volume such that the probe beam is reflected off of a point or a surface of the second side, and to couple the reflective probe beam out of the back volume into the optical circuit. The evaluation circuit in these embodiments further comprises a detector, which is configured to detect the reflected probe beam.

In order to realize the above-mentioned optical readout scheme, the ASIC on the ASIC die may comprise all necessary components for performing the readout. These components include a light source, which may be a laser, e.g. a vertical cavity surface emitter laser, VCSEL, and an optical element such as a beam splitter and a detector. The beam splitter is for example configured to direct the probe beam through the back volume onto a reflection point or onto a reflection surface of the second side of the diaphragm, and subsequently to capture the reflected probe beam and to direct it towards a detector for further analysis and generation of a measurement signal. The guiding of the probe beam on the ASIC die may be realized by means of waveguides or by means of free space optics.

The above mentioned object is further solved by an acoustic microphone assembly that comprises an integrated optical transducer according to one of the embodiments described above and a printed circuit board, PCB, which is in contact with, e.g. soldered to, the integrated optical transducer and electrically connected to the ASIC die.

An acoustic microphone assembly according to one of the embodiments described above may be conveniently employed in various applications that require a compact high sensitivity sensor for detecting small dynamic pressure changes, particularly in the audio band for the detection of sound waves.

The above mentioned object is further solved by an electronic device, such as an audio device or a communication device, comprising an acoustic microphone assembly with an integrated optical transducer according to one of the embodiments described above. The transducer in such a device is configured to omnidirectionally detect dynamic pressure changes in the environment, e.g. dynamic pressure changes at rates corresponding to audio frequencies.

A microphone assembly according to the present disclosure is designed to be employed in portable computing devices such as laptops, notebooks and tablet computers, but also in portable communication devices like smartphones, smart watches and headphones, in which space for additional components is extremely limited.

In some embodiments of the acoustic microphone assembly, the assembly is configured as a front port microphone or as a bottom port microphone.

Depending on the application, in particular on the architecture of the application, a front port or a bottom port microphone may be advantageous. In a front port microphone, the PCB is arranged on a surface of the ASIC die facing away from the MEMS die. On the other hand in a bottom port microphone, the PCB is arranged on a surface of the MEMS die facing away from the ASIC die and comprises an opening such that incident pressure waves may reach the first side of the diaphragm.

The object is further solved by a method for manufacturing an integrated optical transducer for detecting dynamic pressure changes. The method comprises providing a microelectromechanical system, MEMS, die having a MEMS diaphragm with a first side exposed to the pressure waves and a second side. The method further comprises providing an application specific integrated circuit, ASIC, die having an evaluation circuit configured to detect a deflection of the MEMS diaphragm, in particular of the second side of the MEMS diaphragm. The method further comprises arranging the MEMS die with respect to the ASIC die such that a gap with a gap height is formed between the second side of the diaphragm and a first surface of the ASIC die. According to the improved concept, the MEMS diaphragm, the ASIC die and a suspension structure of the MEMS die delineate a back volume of the integrated optical transducer.

Further embodiments of the method become apparent to the skilled reader from the embodiments of the transducer described above.

BRIEF DESCRIPTION OF THE DRAWINGS

The following description of Figures of example embodiments may further illustrate and explain aspects of the improved concept. Components and parts of the transducer with the same structure and the same effect, respectively, appear with equivalent reference symbols. In so far as components and parts of the microphone assembly correspond to one another in terms of their function in different figures, the description thereof is not repeated for each of the following figures.

DETAILED DESCRIPTION

Figure 1:
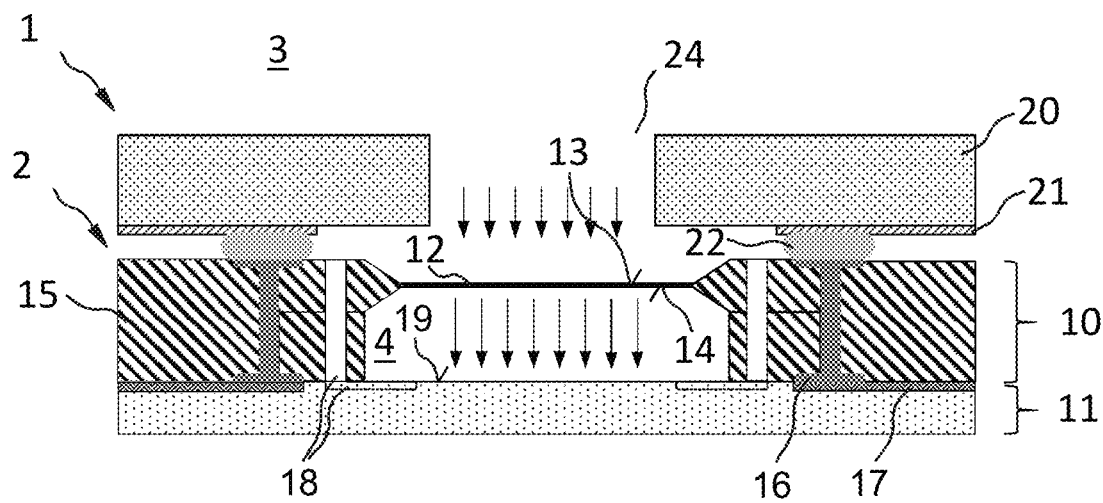
FIG. 1 shows an exemplary embodiment of a microphone assembly with an integrated optical transducer according to the improved concept.

FIG. 1 shows a cross section view of a microphone assembly 1 that comprises an integrated optical transducer 2 according to the improved concept. In particular, the microphone assembly 1 shown comprises an integrated optical transducer 2 which is electrically and mechanically connected to contact pads 21 of a printed circuit board, PCB, 20.

The integrated optical transducer 2 comprises a micro-electro-mechanical systems, MEMS, die 10 as a first die and an application-specific integrated circuit, ASIC, die 11 as a second die. The MEMS die 10 is in fused contact with the ASIC die 11, for example the two dies 10, 11 are bonded via conventional wafer bonding techniques which may be of an adhesive or of a eutectic type. The two dies 10, 11 may be the only dies of the integrated optical transducer 2.

The MEMS die 10 comprises a MEMS diaphragm 12, which may be a suspended membrane made of a crystalline or polycrystalline material such as silicon or poly-silicon, a dielectric, or a metal. The diaphragm 12 comprises a first side 13 which is exposed to dynamic pressure changes such as acoustic waves in an environment 3 of the transducer 2. The diaphragm 12 further comprises a second side 14. A typical diameter for a diaphragm 12 configured to be sensitive to sound waves is in the order of 0.25 mm to 1.5 mm.

The suspension of the diaphragm 12 is realized through a suspension structure 15 which clamps the diaphragm 12 and may be made of a single material, in particular a substrate material of the MEMS die such as silicon, or may comprise more than one material, for example the substrate material and a material of the diaphragm 12. The suspension structure 15 may further act as a bonding structure for bonding the MEMS die 10 to the ASIC die 11.

The MEMS die 10 is arranged with respect to the ASIC die 11 in such a fashion that a back volume 4 is formed as a cavity, which is delineated by the second side 14 of the diaphragm 12, a first surface 19 of the ASIC die 11 and the suspension structure 15. The back volume 4 is characterized by the diameter of the diaphragm 12 and a gap height of a gap between the second side 14 of the diaphragm 12 and the first surface 19 of the ASIC die 11. The gap height is equal to or larger than 100 μm, in particular equal to or larger than 200 μm. Moreover, the back volume 4 is free from further elements such as a perforated back plate or a grating element commonly found in conventional transducers.

The transducer 2 in this exemplary embodiment further comprises pressure equalization channels 18 which extend through the suspension structure 15 of the MEMS die 10 and as a trench also partially through the ASIC die 11. The pressure equalization channels 18 are configured to connect the back volume 4 to the environment 3 for ensuring an equal pressure, for example air pressure, of the environment 3 and the back volume 4. With this, changes in the static pressure of the environment 3 propagate into the back volume 4 allowing for an invariable sensitivity for dynamic pressure changes, such as sound waves.

Moreover, the transducer 2 in this embodiment comprises vias 16 extending through the suspension structure 15 and enabling electrical access to contacts 17 of the ASIC die 11. The vias 16 may be through-substrate vias and filled by a metal, for instance.

Besides contacts 17, the ASIC die 11 further comprises an ASIC which is configured to detect a movement of the diaphragm 12, for example a periodical deflection due to an oscillation of the diaphragm 12. The ASIC may for example comprise a light source, e.g. a coherent light source such as a laser, for emitting a probe beam and an optical element that is configured to direct the probe beam through the back volume 4 onto a point or a surface of the second side 14 of the diaphragm 12. The ASIC may further comprise a detector that is configured to detect the reflected probe beam and to generate an electrical signal based on the detected light. The detector may be a segmented photodiode, for instance. The ASIC may further comprise a processing unit that is configured to map the electric signal to a deflection signal and to output the signal to an output port. Alternatively, the ASIC may be configured to output the electric signal to an external processing unit via an output port.

To form the microphone assembly 1, the transducer 2 is fused to a PCB 20, for example by means of soldering via solder connections 22 that electrically connect the contact pads 21 of the PCB 20 with the ASIC on the ASIC die 11 of the transducer 2, in this embodiment through the vias 16. In this embodiment, the microphone assembly 1 is arranged to form a bottom port microphone characterized in that the dynamic pressure changes pass through an acoustic inlet port 24 formed by an opening of the ASIC die 20 before impinging on the first side 13 of the diaphragm 12 and causing a deflection of the latter.

The large gap forming the back volume 4 implies low noise and higher signal caused by acoustic impedance as the back volume 4 of a transducer 2 according to the improved concept contains a significantly larger amount of air. This means that air compression due to deflection of the diaphragm 12 does not destructively influence the movement of the diaphragm 12 in the same degree as it does in conventional microphones with small back volumes and hence a high acoustic impedance.

Figure 2:
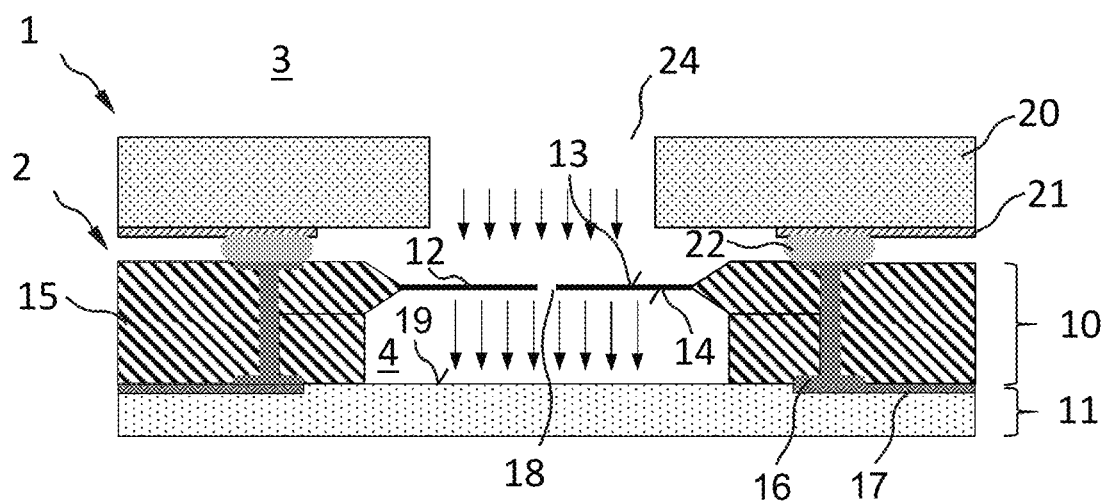
FIG. 2 shows a further exemplary embodiment of a microphone assembly.

FIG. 2 shows an alternative embodiment of a bottom port microphone assembly 1, which is based on that shown in FIG. 1. The difference of this embodiment is the realization of the pressure equalization channel 18 which in this embodiment is formed by an opening in the diaphragm.

This alternative solution for achieving equal pressure in the back volume 4 and in the environment 3 may be advantageous in applications in which an equalization channel through the suspension structure 15 and/or the ASIC die 11 is not viable in a straightforward fashion. Depending on the manufacturing process of the MEMS die 10, the solution presented in FIG. 2 may imply a simpler and/or more cost effective fabrication.

Figure 3:
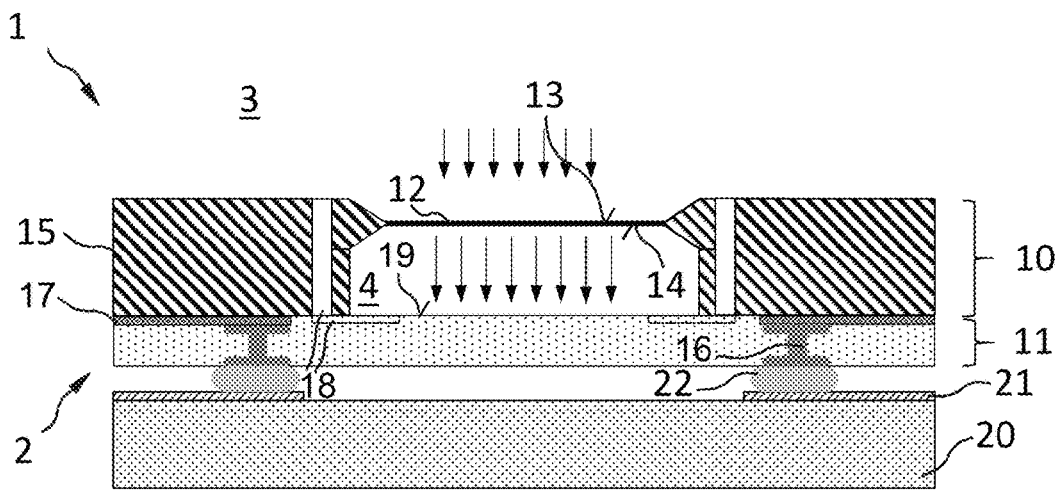
FIG. 3 shows a further exemplary embodiment of a microphone assembly.

FIG. 3 shows an alternative embodiment of a microphone assembly which in this case forms a front port microphone assembly. Compared to the embodiments shown in FIGS. 1 and 2, the front port architecture is characterized by the PCB 20 being arranged on a side of the ASIC die 11 facing away from the MEMS die 10 and the first surface 19, respectively.

In particular, a consequent main difference of this embodiment is that the vias 16 do not extend through the MEMS die 10 but through the ASIC die 11. Particularly for through-substrate vias made of metal, this embodiment may be preferred for certain applications as certain processing steps involving metallic materials may be incompatible with the MEMS process for manufacturing the MEMS die 10.

Consequently, according to this architecture, the PCB 20 is not required to comprise the acoustic inlet port 24.

Figure 4:
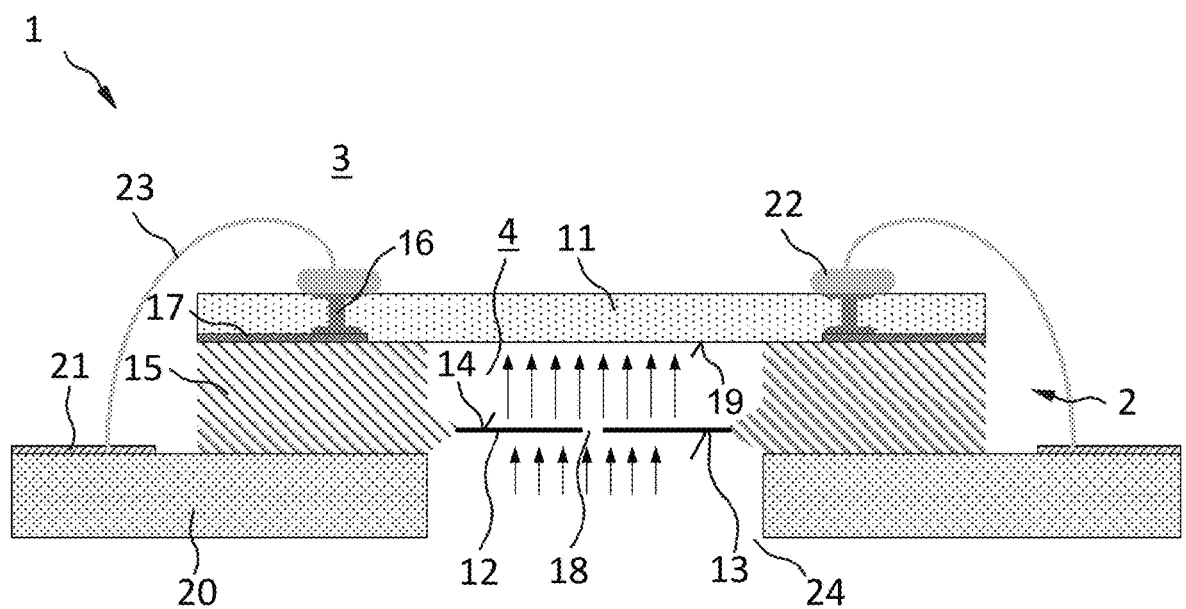
FIG. 4 shows a further exemplary embodiment of a microphone assembly.

FIG. 4 shows an alternative embodiment of a bottom port microphone assembly, in which the PCB 20 is arranged on a side of the MEMS die 10 facing away from the ASIC die 11, similar to the embodiments shown in FIGS. 1 and 2. The difference of this embodiment is that the vias 16, as in FIG. 3, extend through the ASIC die providing electrical connections between the contacts 17 of the ASIC on the ASDIC die 11 and the solder connections 22. The connection between the solder connections 22 and the contact pads 21 of the PCB 20 is realized through wires 23 whose ends are electrically connected to the solder connections 22 and the contact pads 21, respectively.

Figure 5:
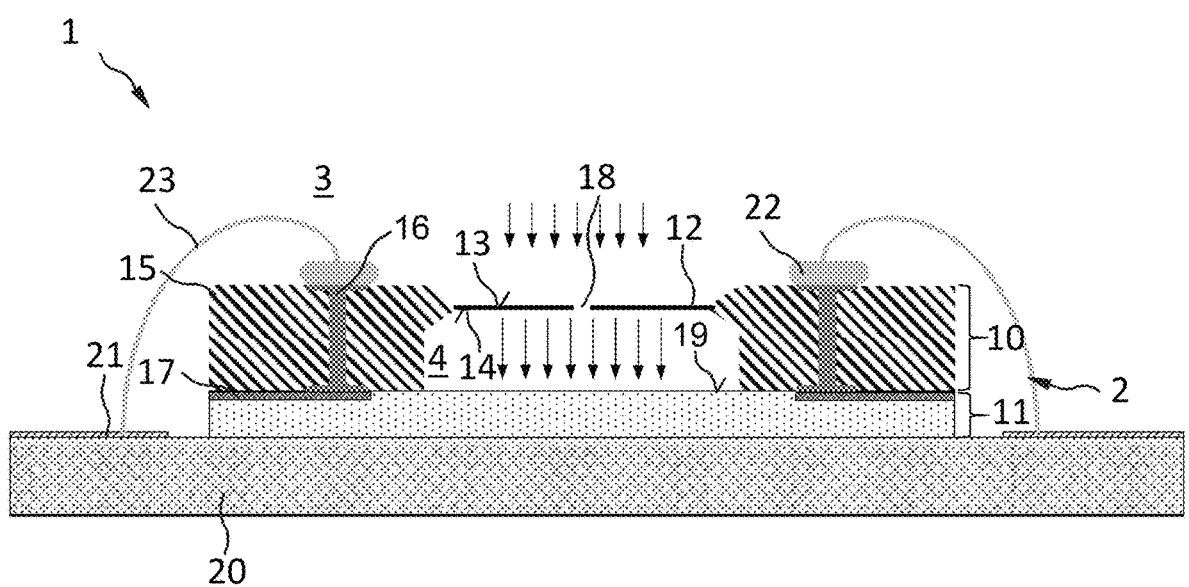
FIG. 5 shows a further exemplary embodiment of a microphone assembly.

FIG. 5 shows a similar embodiment of the microphone assembly compared to that in FIG. 4 with the difference that the microphone here is configured as a front port microphone. Alternatively, the ASIC wafer may also contain through substrate vias and connect directly through on to the PCB.

The embodiments shown in the FIGS. 1 to 5 as stated represent exemplary embodiments of the microphone assembly 1 and the transducer 2, therefore they do not constitute a complete list of all embodiments according to the improved concept. Actual transducer and microphone assembly configurations may vary from the embodiments shown in terms of shape, size and materials, for example.

A microphone assembly according to one of the embodiments shown may be conveniently employed in various applications that require a compact high sensitivity sensor for detecting small dynamic pressure changes, particularly in the audio band for the detection of sound waves. Possible applications include an employment as an acoustic microphone in computing devices such as laptops, notebooks and tablet computers, but also in portable communication devices like smartphones and smart watches, in which space for additional components is extremely limited.

The invention claimed is:

1. An integrated optical transducer for detecting dynamic pressure changes comprising
    a micro-electro-mechanical system, MEMS, die having a MEMS diaphragm with a first side exposed to the dynamic pressure changes and a second side; and
    an application-specific integrated circuit, ASIC, die having an evaluation circuit configured to detect a deflection of the MEMS diaphragm;
    wherein
    the MEMS die is arranged with respect to the ASIC die such that a gap with a gap height is formed between the second side of the diaphragm and a first surface of the ASIC die; and
    the MEMS diaphragm, the ASIC die and a suspension structure of the MEMS die delineate a back volume of the integrated optical transducer.

2. The integrated optical transducer according to claim 1, wherein the integrated optical transducer consists of the MEMS die and the ASIC die as only dies.

3. The integrated optical transducer according to claim 1, wherein the MEMS die and/or the ASIC die further comprises stress release structures.

4. The integrated optical transducer according to claim 1, wherein the gap height is equal to or larger than 20 µm.

5. The integrated optical transducer according to claim 1, further comprising a pressure equalization channel connecting the back volume with an environment of the integrated optical transducer.

6. The integrated optical transducer according to claim 5, wherein the pressure equalization channel extends through the MEMS die.

7. The integrated optical transducer according to claim 5, wherein the pressure equalization channel extends at least partially through the ASIC die.

8. The integrated optical transducer according to claim 1, further comprising a via extending through the MEMS die and being in electrical contact with the ASIC die.

9. The integrated optical transducer according to claim 1, wherein
the MEMS diaphragm is electrically isolated from the ASIC die; or
the MEMS diaphragm is electrically connected to the ASIC die.

10. The integrated optical transducer according to claim 1, wherein the evaluation circuit comprises
a light source configured to emit a probe beam;
an optical element configured to
couple the probe beam from an optical circuit of the ASIC die into the back volume such that the probe beam is reflected off of a point or a surface of the second side; and
couple the reflected probe beam out of the back volume into the optical circuit; and
a detector configured to detect the reflected probe beam.

11. The integrated optical transducer according to claim 1, wherein the integrated optical transducer is an omnidirectional transducer.

12. The integrated optical transducer according to claim 1, wherein the MEMS diaphragm is free of perforations, patterns, structures or the like.

13. The integrated optical transducer according to claim 1, wherein the back volume is free from
further elements such as a perforated back plate and optical elements such as a grating element.

14. An acoustic microphone assembly comprising
an integrated optical transducer according to claim 1; and
a printed circuit board, PCB, in contact with the integrated optical transducer and electrically connected to the ASIC die.

15. The acoustic microphone assembly according to claim 14, wherein the acoustic microphone assembly is configured as a front port microphone or as a bottom port microphone.

16. An electronic device, such as an audio device or a communication device, comprising an acoustic microphone assembly with an integrated optical transducer according to claim 1, wherein the transducer is configured to omnidirectionally detect dynamic pressure changes in an environment of the transducer.

17. A method for manufacturing an integrated optical transducer for detecting dynamic pressure changes, the method comprising
providing a micro-electro-mechanical system, MEMS, die having a MEMS diaphragm with a first side exposed to the dynamic pressure changes and a second side;
providing an application specific integrated circuit, ASIC, die having an evaluation circuit configured to detect a deflection of the MEMS diaphragm; and
arranging the MEMS die with respect to the ASIC die such that a gap with a gap height is formed between the second side of the diaphragm and a first surface of the ASIC die;
wherein the MEMS diaphragm, the ASIC die and a suspension structure of the MEMS die delineate a back volume of the integrated optical transducer.

18. The method according to claim 17, wherein the method comprises providing the MEMS die and the ASIC die as only dies.

19. The method according to claim 17, wherein the integrated optical transducer is an omnidirectional transducer.

20. The method according to claim 16, wherein the MEMS diaphragm is free of perforations, patterns, structures or the like.

21. The integrated optical transducer according to claim 1, wherein the evaluation circuit is configured to detect a deflection of the second side of the MEMS diaphragm.

22. The integrated optical transducer according to claim 1, wherein the gap height is equal to or larger than 100 µm.

23. The integrated optical transducer according to claim 1, wherein the pressure equalization channel extends through the MEMS diaphragm or through the suspension structure.

24. The electronic device according to claim 16, wherein the transducer is configured to omnidirectionally detect dynamic pressure changes at rates corresponding to audio frequencies.

* * * * *